United States Patent
Frenne et al.

(10) Patent No.: US 11,503,623 B2
(45) Date of Patent: *Nov. 15, 2022

(54) APPARATUSES AND METHODS FOR SCHEDULING OBJECT CONFIGURATION

(71) Applicant: TELEFONAKTIEBOLAGET LM ERICSSON (PUBL), Stockholm (SE)

(72) Inventors: Mattias Frenne, Uppsala (SE); Sebastian Faxér, Stockholm (SE); Stephen Grant, Pleasanton, CA (US); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,739

(22) Filed: Jan. 21, 2022

(65) Prior Publication Data

US 2022/0150931 A1 May 12, 2022

Related U.S. Application Data

(63) Continuation of application No. 17/227,861, filed on Apr. 12, 2021, which is a continuation of application
(Continued)

(51) Int. Cl.
*H04W 72/12* (2009.01)
*H04W 76/27* (2018.01)
(Continued)

(52) U.S. Cl.
CPC ...... *H04W 72/1273* (2013.01); *H04B 7/0626* (2013.01); *H04B 7/088* (2013.01);
(Continued)

(58) Field of Classification Search
None
See application file for complete search history.

(56) References Cited

U.S. PATENT DOCUMENTS

| 2015/0063374 A1 | 3/2015 | Venkatachalam Jayaraman et al. |
| 2018/0041319 A1 | 2/2018 | Cheng et al. |
| 2019/0222277 A1* | 7/2019 | Park ..................... H04B 7/0695 |

FOREIGN PATENT DOCUMENTS

| CN | 101449618 A | 6/2009 |
| CO | 15135531 | 11/2013 |

(Continued)

OTHER PUBLICATIONS

3GPP TS 36.211 V15.7.0, "3rd Generation Partnership Project; Technical Specification Group Radio Access Network; Evolved Universal Terrestrial Radio Access {E-UTRA}; Physical channels and modulation (Release 15)", 3GPP TS 36.211 V15.7.0, Sep. 2019, pp. 1-239.

(Continued)

*Primary Examiner* — Christine T Duong

(57) ABSTRACT

A beam management method is performed by a UE. Related host computers, network devices, and communications systems are disclosed. In one embodiment the method includes: the UE receiving a first scheduling message regarding a first scheduled downlink transmission for the UE, wherein the first scheduling message comprises pointer information pointing to an object configured in the UE. As a result of receiving the first scheduling message: the UE obtains the pointer information from the first scheduling message; the UE determines a preferred receiver configuration that is currently associated with the obtained pointer information; and the UE uses the determined preferred receiver configuration to receive the first scheduled downlink transmission.

11 Claims, 14 Drawing Sheets

Related U.S. Application Data

No. 16/614,940, filed as application No. PCT/SE2018/050565 on Jun. 1, 2018, now Pat. No. 11,006,439.

(60) Provisional application No. 62/520,062, filed on Jun. 15, 2017.

(51) Int. Cl.
*H04B 7/06* (2006.01)
*H04B 7/08* (2006.01)
*H04L 5/00* (2006.01)

(52) U.S. Cl.
CPC ....... *H04L 5/0051* (2013.01); *H04W 72/1289* (2013.01); *H04W 76/27* (2018.02)

(56) References Cited

FOREIGN PATENT DOCUMENTS

| | | |
|---|---|---|
| EP | 2993804 A1 | 3/2016 |
| KR | 101243200 B1 | 3/2010 |
| KR | 101164748 B1 | 8/2010 |
| WO | 2014075043 A2 | 5/2014 |
| WO | 2016056970 A1 | 4/2016 |
| WO | 2016086144 A1 | 6/2016 |
| WO | 2017095467 A1 | 6/2017 |
| WO | 2017078210 | 11/2017 |
| WO | 2018083253 A1 | 5/2018 |

OTHER PUBLICATIONS

3GPP TS 36.212 V15.7.0, "Technical Specification Group Radio Access Network; Evolved Universal Terrestrial Radio Access (E-UTRA); Multiplexing and channel coding (Release 15)", 3GPP TS 36.212 V15.7.0, Sep. 2019, pp. 1-246.

3GPP TS 36.213 V15.7.0, "3rd Generation Partnership Project; Technical Specification Group Radio Access Network; Evolved Universal Terrestrial Radio Access (E-UTRA); Physical layer procedures (Release 15)", 3GPP TS 36.213 V15.7.0, Sep. 2019, pp. 1-551.

3GPP TS 36.321 V15.7.0, "3rd Generation Partnership Project; Technical Specification Group Radio Access Network; Evolved Universal Terrestrial Radio Access {E-UTRA); Medium Access Control (MAC) protocol specification {Release 15)", 3GPP TS 36.321 V15.7.0, Sep. 2019, pp. 1-134.

3GPP TS 38.212 V15.7.0, "3rd Generation Partnership Project; Technical Specification Group Radio Access Network; NR; Multiplexing and Channel coding (Release 15)", 3GPP TS 38.212 V15.7.0, Sep. 2019, pp. 1-101.

3GPP TS 38.213 V15.7.0 , "3rd Generation Partnership Project; Technical Specification Group Radio Access Network; NR; Physical layer procedures for control (Release 15)", Sep. 2019.

3GPP TS 38.214 V15.7.0, "3rd Generation Partnership Project; Technical Specification Group Radio Access Network; NR; Physical layer procedures for data (Release 15)", 3GPP TS 38.214 V15.7.0, Sep. 2019, pp. 1-106.

3GPP, "3rd Generation Partnership Project; Technical Specification Group Radio Access Network; NR; Physical channels and modulation (Release 15)", TS 38.211 V15.7.0, Sep. 2019.

ZTE, "Discussion on DL beam management", 3GPP TSG RAN WG1 Meeting #89, May 15-19, 2017, No. R1-1707119, Hangzhou, P.R. China.

"Methods and Systems for Beam Tracking Process Management and Indices", U.S. Appl. No. 62/417,785 for Telefonaktiebolaget LM Ericsson (publ), Nov. 4, 2016, pp. 1-32.

"Methods and Systems for Beam Tracking Process Management and Indices", Stephen Grant, Application No. PCT/EP2017/078210, Nov. 3, 2017, pp. 1-52.

\* cited by examiner

APPARATUSES AND METHODS FOR SCHEDULING OBJECT CONFIGURATION

RELATED APPLICATIONS

This application is a continuation of U.S. application Ser. No. 17/227,861 filed 12 Apr. 2021, which is a continuation of U.S. application Ser. No. 16/614,940 filed 19 Nov. 2019, now granted as U.S. Pat. No. 11,006,439 on 11 May 2021, which is a U.S. National Phase Application of PCT/SE2018/050565 filed 1 Jun. 2018, which claims benefit of Provisional Application No. 62/520,062 filed 15 Jun. 2017. The entire contents of each aforementioned application is incorporated herein by reference.

TECHNICAL FIELD

Disclosed are embodiments for beam management in a system using more than one (i.e., a plurality of) transmit beams.

BACKGROUND

The Third Generation Partnership Project (3GPP) has begun work on the development and design of the next generation mobile communications system (the 5G mobile communication system or simply "5G"). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g., mmW, such as near and above 30 GHz) will be needed to reach the required capacity. At high frequencies the propagation properties are more challenging and high order beamforming at the base station (e.g., eNB or gNB) will be required to reach sufficient link budget. For example, narrow beam transmission and reception schemes may be needed at higher frequencies to compensate for the high propagation loss. For a given communication link, a beam can be applied at the transmission point (TRP) (i.e., a transmit (TX) beam) and a beam can be applied at the user equipment (UE) (i.e., a receive (RX) beam)).

NR will have a beam centric design, which means that the traditional cell concept is relaxed and UEs (i.e., fixed or mobile wireless communication devices, such as smartphones, tablets, sensors, appliances, etc.) will in many cases be connected to and perform "handover" between narrow beams instead of cells. Hence, 3GPP has agreed to introduce concepts for handling mobility between beams (both within and between TRPs). As used herein, a TRP may include, for example, a base station or a component of a base station. At higher frequencies, where high-gain beamforming will be needed, each beam will only be optimal within a small area (i.e., the beam's coverage area) and the link budget outside the coverage area will deteriorate quickly. Hence, frequent and fast beam switching methods are needed to maintain high performance (so called beam management) and it has been agreed to include in the scheduling downlink control information (DCI) message a beam indicator that informs the UE as to which TRP TX beam will be used to transmit the scheduled transmission so that the UE can adjust its RX beam accordingly. This is especially important in case of analog RX beamforming because the UE needs to know the direction in which to point its RX beam before the downlink data arrives.

SUMMARY

When a TRP transmits data to a UE using a chosen TRP TX beam, it is advantageous for the UE to use a UE RX beam that is paired with the chosen TRP TX beam to receive the downlink (DL) transmission (i.e., it is advantageous for the UE to tune its receive beam or receive filter based on the TRP TX beam that that the TRP has chosen to use for the DL transmission). U.S. provisional patent application No. 62/417,785, filed on Nov. 4, 2016, proposes configuring the TRP to send to the UE a dedicated beam indicator to aid the UE in selecting the optimal UE RX beam.

In this disclosure it is proposed that an identifier of an object configured in the UE (e.g., an RRC configured object such as, for example, a reference signal (RS) measurement object configured by a resource setting configuration) take the role of the beam indicator. Hence, in some embodiments, the UE is configured by higher layers with multiple such objects and the UE can keep track of the preferred receiver configuration (e.g. analog RX beam) for each of the objects. The preferred receiver configuration may be updated every time the UE performs a measurement for each object. In some embodiment, each object has multiple reference signals and the UE can keep track of the preferred receiver combination for each reference signal in each object.

When the PDSCH or PUSCH is scheduled, the DCI contains a field that points to the object and the UE can thus apply the receive or transmit filtering (for PDSCH or PUSCH) respectively, according to the object indicated in the DCI. Moreover, the PDCCH/PDSCH and PUCCH/PUSCH can also be associated with the objects, for example by higher layer configuration. If an object has multiple reference signals, the UE will use the preferred receiver configuration for the RS within the indicated object for which the UE has recently indicated to the network a preference. Hence, the network selects an object and the UE has previously selected and RS within that object. This joint network-UE selection determines which receiver configuration the UE should use and which transmitter configuration the network should use for the PDSCH reception/transmission respectively.

Accordingly, embodiments presented herein provide an efficient implementation of the BTPI proposed in application No. 62/417,785. In particular, embodiments remove the need for an explicit indication of beam tracking process ID per CSI-RS resource, and there is no need to establish a beam tracking process framework. Rather, the object ID serves the purpose of beam tracking process indication in an implicit manner, thereby saving signaling overhead and avoiding the need to establish beam tracking processes.

Accordingly, in one aspect there is provided a method performed by a UE. In one embodiment the method includes: the UE receiving a first scheduling message regarding a first scheduled downlink transmission for the UE, wherein the first scheduling message comprises pointer information pointing to an object configured in the UE. As a result of receiving the first scheduling message: the UE obtains the pointer information from the first scheduling message; the UE determines a preferred receiver configuration that is currently associated with the obtained pointer information; and the UE uses the determined preferred receiver configuration to receive the first scheduled downlink transmission.

In some embodiments, the UE is configured to report to a serving node a preferred reference signal among the multiple references signals in the object. In some embodiments, the preferred receiver configuration is an analog receive, RX, beam. In some embodiments, the first scheduling message is Downlink Control Information, DCI. In some embodiments, the pointer information comprises a set of bits of the DCI, which set of bits indicate at least a spatial quasi-co-location, QCL, assumption the UE should assume when receiving the first scheduled downlink transmission. In some embodiments, the measurement object is one of a resource setting, a CSI-RS resource set, and a CSI report setting.

In some embodiments, the method also includes: prior to receiving the first scheduling message, the UE receiving a configuration message for configuring a first RS measurement object and a second RS measurement object; after receiving the configuration message and prior to receiving the first scheduling message, the UE using the first RS measurement object to determine a first preferred receiver configuration; the UE associating the first preferred receiver configuration with the first RS measurement object (e.g., the UE associates the first preferred receiver configuration with the pointer information that points to the first RS measurement object); after receiving the configuration message and prior to receiving the first scheduling message, the UE using the second RS measurement object to determine a second preferred receiver configuration; and the UE associating the second preferred receiver configuration with the second RS measurement object (e.g., the UE associates the second preferred receiver configuration with the pointer information that points to the second RS measurement object), whereby the UE is configured such that: if the pointer information included in the first scheduling message points to the first RS measurement object, then the UE uses the first preferred receiver configuration to receive the scheduled downlink transmission, and if the pointer information included in the first scheduling message points to the second RS measurement object, then the UE uses the second preferred receiver configuration to receive the scheduled downlink transmission.

In some embodiments, the method may further include: after using the first RS measurement object to determine the first preferred receiver configuration, the UE in a later slot using the first RS measurement object to determine a third preferred receiver configuration; after determining the third preferred receiver configuration, the UE associating the third preferred receiver configuration with the first RS measurement object and disassociating the first preferred receiver configuration with the first RS measurement object; the UE receiving a second scheduling message regarding a second scheduled downlink transmission for the UE, wherein the second scheduling message comprises pointer information pointing to the first RS measurement object; in response to receiving the second scheduling message, the UE determining that the third preferred receiver configuration is currently associated with the first RS measurement object; and as a result of the UE determining that the third preferred receiver configuration is currently associated with the first RS measurement object, the UE using the third preferred receiver configuration to receive the second scheduled downlink transmission.

In another aspect, a UE configured to perform the foregoing process is provided.

In another aspect there is provided a method for beam management, where the method is performed by a network. The method includes: configuring a UE with a plurality of RS measurement objects, each one of the plurality of RS measurement objects containing at least one measurement resource; transmitting measurement resources for each of the configured RS measurement objects; storing, for each RS measurement object, a transmitter configuration used to transmit each measurement resource within the RS measurement object; for each of the RS measurement object, receiving a measurement report from the UE comprising an indicator of the preferred measurement resource within each RS measurement object; transmitting to the UE a first scheduling message regarding a first scheduled downlink transmission for the UE, wherein the first scheduling message comprises pointer information pointing to one of the RS measurement objects configured in the UE; and after transmitting the first scheduling message, transmitting the first scheduled downlink transmission using a transmit configuration corresponding to a preferred measurement resource within the RS measurement object to which the pointer information points.

BRIEF DESCRIPTION OF THE DRAWINGS

The accompanying drawings, which are incorporated herein and form part of the specification, illustrate various embodiments.

DETAILED DESCRIPTION

Figure 1A:
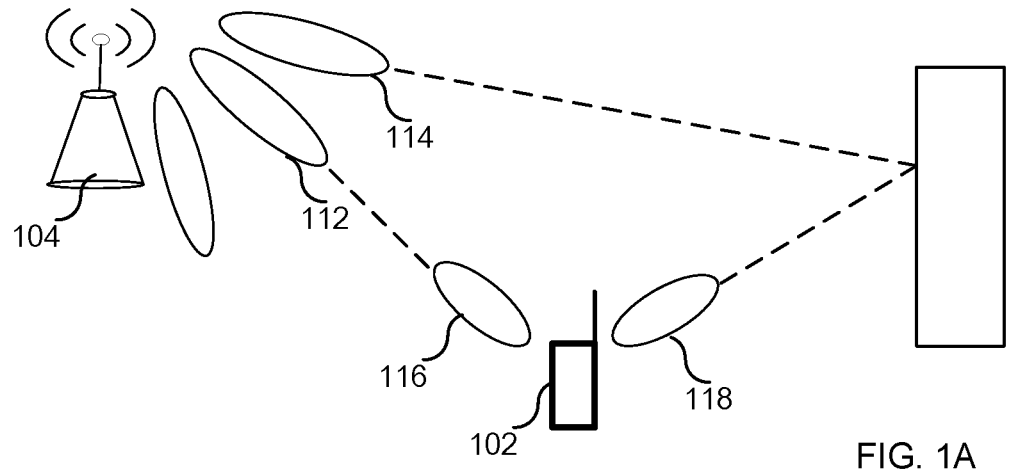
FIGS. 1A, 1B and 1C illustrate the use of active and monitored TX beams for communications between a TRP and a UE.

To perform measurements of channel quality of a certain beam, a beamformed reference signal (RS) may be used. This RS can be a channel state information RS (CSI-RS), a synchronization signal block (SSBlock), a time frequency tracking RS (TRS), or other RS. Beamforming may include, for instance, transmitting the same signal from multiple antenna elements of an antenna array with an amplitude and/or phase shift applied to the signal for each of the antenna elements. These amplitude/phase shifts are commonly denoted as the antenna weights and the collection of the antenna weights for each of the antennas is a precoding vector.

Different precoding vectors give rise to a beamforming of the transmitted signal and the weights can be controlled so that the signals are coherently combining in a certain angle direction as seen from the antenna array, in which case it may be said that a beam is formed in that "direction." If the antennas of the array are placed in two dimensions (i.e., in a plane), then the beam can be steered in both azimuth and elevation directions with respect to the plane perpendicular to the antenna array.

Although the term beam is used herein, there are other precoding vectors that give a transmission that is matched to the channel and which does not give a beam in a strict sense. For instance, if the channel is known at the TRP, the precoding weight can be controlled so that the signal strength is maximized at the UE, instead of forming a beam to give the maximal array gain in a certain direction. Matched channel precoding may be optimal for maximizing the signal power at the receiver, but may require accurate channel information. In line of sight channels however, the use of a beam is often near optimal. Though discussed with respect to beams, the disclosures herein are presented without loss of generality.

In NR it is proposed that CSI-RS are used as reference signals for beam management, but other signal are also being considered (e.g., SSBlocks). In the following we will denote the RS used for beam management as CSI-RS without loss of generality. The network (NW), the NR base station (gNB), or another node may configure the UE with a CSI-RS configuration by a control message such as a radio resource control (RRC) message. Each configuration can contain information identifying one or multiple CSI-RS resources. One or multiple UEs may then perform measurements on these identified CSI-RS resources and report the result back to the network.

1. Measurements for Beam Management

In one beam measurement procedure, each CSI-RS resource in a resource setting is transmitted in a different TRP TX beams (i.e. with a different multi-antenna precoding weight to form beams in different directions as seen from the TRP antenna array). The UE is configured to perform channel quality measurements (such as reference signal received power (RSRP)) using the configured CSI-RS resources corresponding to the different TRP TX beams and it may further be configured to report back these measurements to the NW. The UE may report the RSRP of the CSI-RS resource with highest RSRP plus an indicator of which resource that is. Alternatively, the UE may report back the top-N resources where N>1. In this way it is possible, by using the measurement report(s), for the NW to find a preferred TRP TX beam(s) for a given UE.

In another beam measurement procedure, each CSI-RS resource is transmitted using the same particular TRP TX beam. In this way, the UE can evaluate several different UE RX beams for the particular TRP TX beam, and find a preferred or "optimal" UE RX beam for the particular TRP TX beam. The repeated transmission of the CSI-RS resource in the same beam, in e.g. different OFDM symbols or using a frequency-domain comb resulting in a time-domain repetition pattern, is useful for example when analog receive beamforming is applied at the UE since the UE can then switch RX beam between the OFDM symbols and evaluate the link quality.

The CSI-RS transmission can be either aperiodic (for example event triggered) or transmitted in a semi-persistent/periodic manner. In case the CSI-RS transmission is transmitted in a semi-persistent/periodic manner, the measurement reports can also be configured in a semi-persistent/periodic manner.

Using the measurement procedures described above, the UE can find a preferred TRP TX beam and for that TRP TX beam a corresponding preferred UE RX beam. The TX-RX beam pair is sometimes referred to as a beam pair link (BPL).

2. Robust Beam Management

One problem, however, with connecting UEs to narrow beams is that the BPL could easily be deteriorated, for example, if an object gets in the way of the link and blocks it. Due to what is often high penetration loss and poor diffraction properties at high frequencies, a blocking object can lead to lost connection between the TRP and UE (so called a beam link failure (BLF) or BPL failure (BPLF)), which might lead to dropped calls and bad user experience.

Figure 1B:
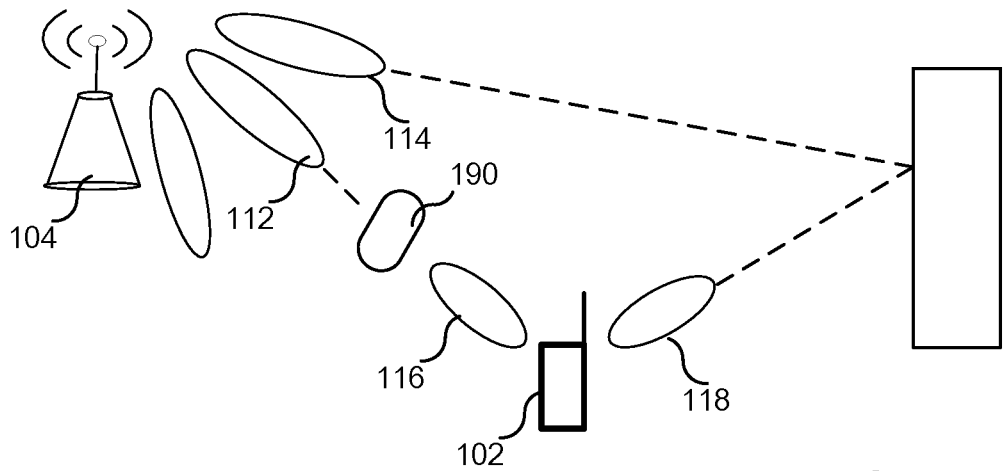
Figure 1C:
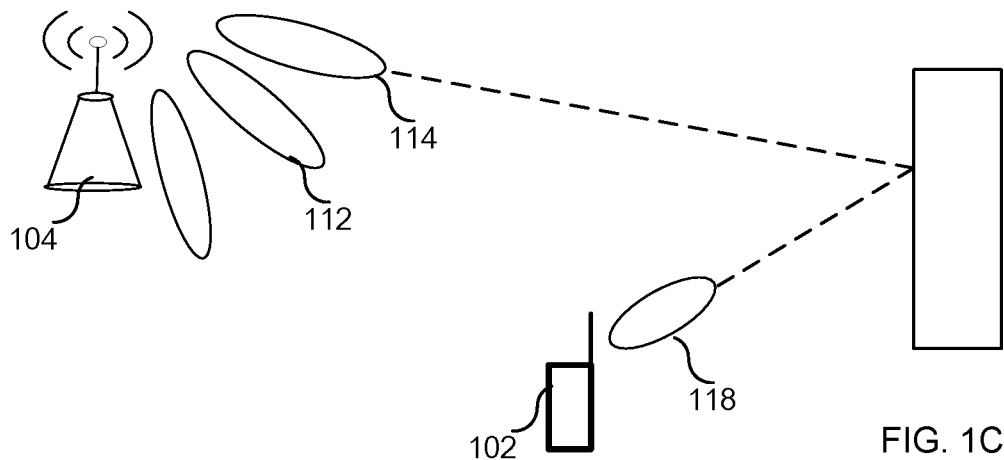

One way to mitigate the problem of beam link failure is to use a second, monitored (a.k.a., "backup") transmit beam that can be used in case the first, active TX beam experiences a BLF (e.g., is blocked). Hence, at least two TX beams may be used to connect with a UE. An example of this is illustrated in FIGS. 1A, 1B and 1C. In FIG. 1A, there is shown a TRP 104 (e.g., a base station) using one active TX beam 112 to transmit to a UE 102 control information and user data and further using one monitored (backup) TX beam 114 for UE 102. In FIG. 1B there is shown an object 190 that is blocking the active TX beam, thereby causing UE 102 to detect a BLF with respect to the active TX beam 112. To restore the connection between TRP 104 and UE 102, TRP 104 can use the monitored TX beam 114 as the active TX beam for UE 102, as illustrated in FIG. 1C. According to certain aspects, the purpose of the monitored link is thus to (1) discover new links that may better than the active link; and (2) provide a backup link in case the active link is broken.

In the example of FIGS. 1A-C, there is one UE RX beam associated with each TRP TX beam 112 and 114, which is often the case if analog or hybrid receive beamforming is used at UE 102. Specifically, UE RX beam 116 is paired with TRP TX beam 112 and UE RX beam 118 is paired with TRP TX beam 114. In the case UE 102 uses pure analog receive beamforming, UE 102 can only tune its RX beam to one TRP transmit beam at a time, e.g. per OFDM symbol. Likewise, if TRP 104 uses analog transmit beamforming, only one beam can be transmitted at a time, e.g. per OFDM symbol. Hence, there is a need to align the transmit beam with the correct receive beam at a given time. For each of the TRP TX beams, at a given point in time, there is an preferred or "optimal" UE RX beam (i.e., parameters) associated with it, among the set of possible UE RX beams.

3. Signaling for Beam Management

For NR, it has been agreed that for reception of unicast DL data channel, NR supports indication of spatial QCL assumption between DL RS antenna port(s) and DMRS antenna port(s) of DL data channel: Information indicating the RS antenna port(s) is indicated via DCI (downlink grants), i.e. UE specific indication. The information indicates the RS antenna port(s) which is QCL-ed with DMRS antenna port(s) and spatial QCL ("spatial quasi-co-location") can be interpreted as the DL RS and DMRS can be received in a spatially equivalent way at the UE, in other words using the same spatial filter, spatial precoder or beam.

One way to find and maintain the preferred TRP and UE beams for each link (active or monitored) is to configure a separate beam tracking processes per link. A beam tracking process can be defined at the NW and associated with a transmission of reference signals (e.g. CSI-RS, BRS or similar) in different beams, which will be measured and reported back from the UE. Hence, each beam tracking process can be updated using measurements associated with the process. The aim of the measurements is to update and refine the TRP TX beam and UE RX beam, often referred to as the beam pair link (BPL). Although the disclosures herein are provided with respect to the downlink, the BPL can be used for the uplink transmission as well, particularly where the UE RX beam and UE TX beams are well calibrated (same beam direction) and the same for TRP TX beam and TRP RX beams. That is, the processes disclosed herein can be used to identify and manage the beams used for uplink communications.

U.S. provisional patent application No. 62/417,785, filed on Nov. 4, 2016, introduces an establishment of beam tracking processes and hence, a beam tracking process index in the CSI-RS configuration such that the UE will know, when performing measurements on a CSI-RS, which CSI-RS configuration corresponds to which beam tracking process (and link). Thereby, the network can trigger measurement of different beam tracking processes by dynamic indication of the beam tracking process index. Also, an additional flag can be included in the CSI-RS configuration that states if the CSI-RS configuration and thus related measurement is not related to any beam tracking processes. Hence, each CSI-RS may have an explicit indicator bit field that indicates the beam tracking process to which the resource belongs.

4. Measurements for Link Adaptation in CSI Framework

Figure 2:
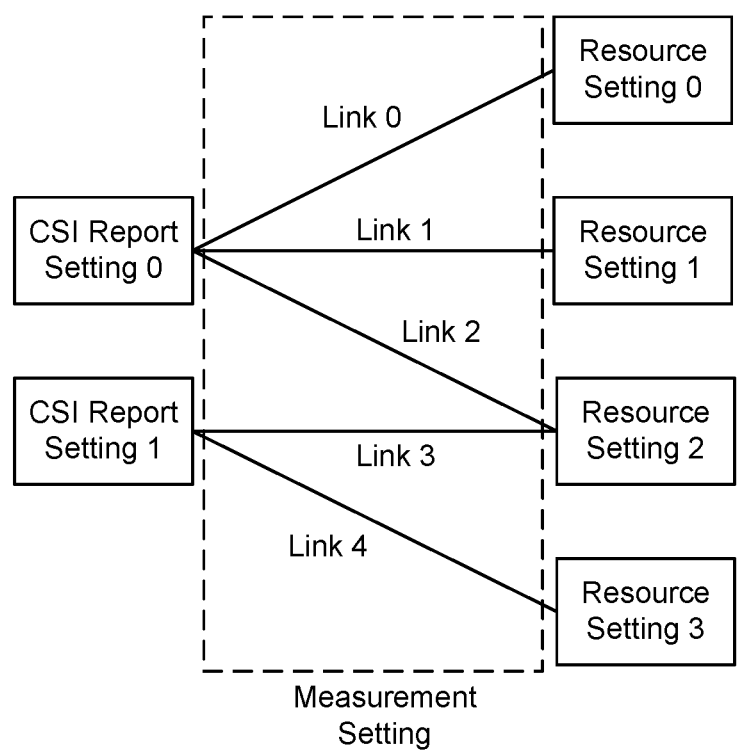
FIG. 2 shows an example of a CSI framework.

The CSI framework agreed for NR allows a wide variety of use cases, as well as dynamic reuse of CSI resources. As per the agreed CSI framework, a UE can be configured by higher layers with N≥1 CSI Report Settings, M≥1 Resource Settings, and 1 CSI Measurement Setting. The Measurement Setting includes L≥1 links where each link associates one Report Setting with one Resource Setting. FIG. 2 shows an example of the agreed CSI framework in NR, where N=2, M=4, and L=5.

Within each CSI Report Setting, a UE is configured (by higher layers) with parameters such as the reported CSI parameter(s), codebook configuration parameters, time-domain behavior (i.e., periodic, semi-persistent, or aperiodic) of CSI reporting, codebook subset restriction and measurement restriction.

Figure 3:
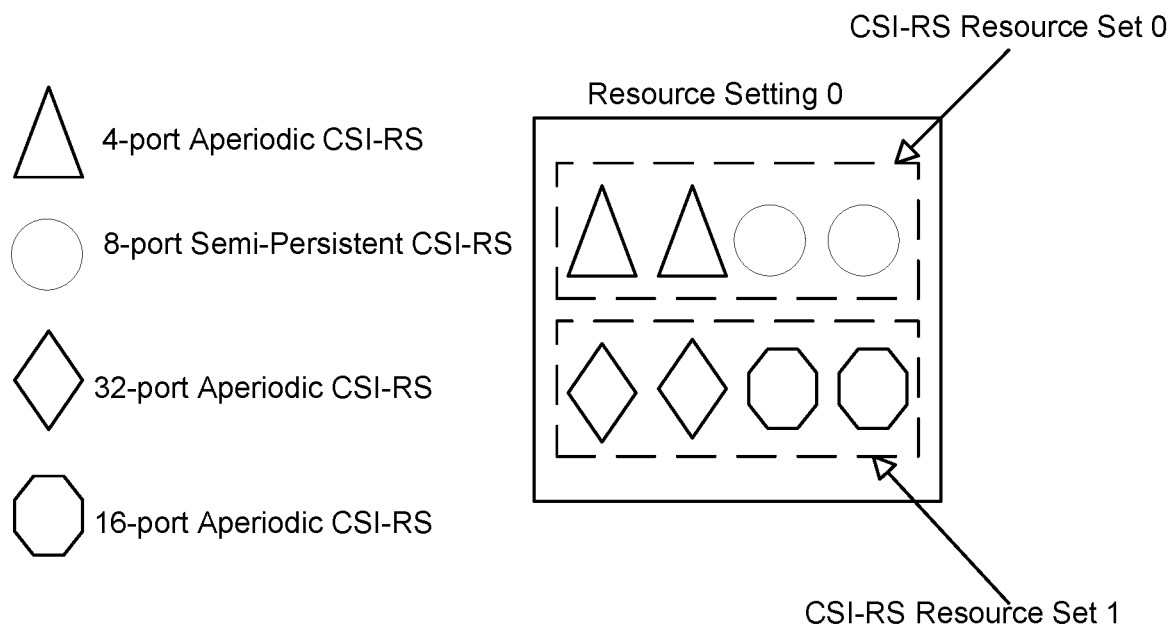
FIG. 3 illustrates example Resource Setting.

Within each Resource Setting, a UE is configured (by higher layers) with a configuration of S≥1 CSI-RS Resource Sets. Within each CSI-RS resource set, the UE is further configured by higher layers with $K\_s \geq 1$ CSI-RS resources where the CSI-RS resources can have a different mapping to REs, different number of ports, and different time-domain behavior (i.e., periodic, semi-persistent, or aperiodic). An example Resource Setting with S=2 CSI-RS resource sets is shown in FIG. 3. In this example, the two CSI-RS resource sets consist of 4 CSI-RS resources each (that is, $K\_1=4$ and $K\_2=4$). As seen in the example of FIG. 3, the CSI-RS resources within each CSI-RS resource set have mixed number of ports and time-domain behavior. The UE then receives a dynamic indication including the following if applicable: a) one or more CSI Report Settings selected from within the CSI Measurement Setting; b) one or more CSI-RS Resource Sets selected from at least one Resource Setting; and c) one or more CSI-RS resources selected from at least one CSI-RS resource set.

5. Mechanisms for Control Signaling

Discussed in this section are different ways of performing the dynamic indication mentioned above.

LTE control signaling can be carried in a variety of ways, including carrying control information on PDCCH or PUCCH, embedded in the PUSCH, in MAC control elements (MAC CEs), or in RRC signaling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213 for LTE and 38.211, 38.212, 38.213 and 38.214 for NR. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be LDPC coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

6. Embodiments

As discussed in the summary section, when a TRP transmits data to a UE using a chosen TRP TX beam, it is advantageous for the UE to receive the downlink (DL) transmission using the UE RX beam that is paired with the chosen TRP TX beam (i.e., it is advantageous for the UE to tune its receive beam or receive filter based on the TRP TX beam that that the TRP has chosen to use for the DL transmission). U.S. provisional patent application No. 62/417,785, filed on Nov. 4, 2016, proposes configuring the TRP to send to the UE a dedicated beam indicator (alternatively a beam process indicator) to aid the UE in selecting the optimal UE RX beam. For each such beam process, the UE stores a preferred UE RX beam and network stores the associated TX beam.

In this disclosure it is proposed that an identifier of an object configured in the UE (e.g., an RRC configured object such as, for example, a reference signal (RS) measurement object, a resource setting) take the role of the beam indicator. The beam indication is thus implicit, there are no explicit "beam indication" bits being, the object identifier is instead reused as an implicit beam indication. Hence, in some embodiments, the UE is configured by higher layers with at least two such objects and the UE can keep track of the preferred receiver configuration (e.g. analog RX beam) for each of the objects. The preferred receiver configuration for an object may be updated every time the UE performs a measurement for each object.

When the PDSCH or PUSCH is scheduled, the DCI contains a field that points to the object and the UE can thus apply the receive or transmit filtering (for PDSCH or PUSCH) respectively, according to the object indicated in the DCI. Moreover, the PDCCH/PDSCH and PUCCH/PUSCH can also be associated with the objects, for example by higher layer configuration.

Accordingly, embodiments presented herein provide an efficient implementation of the BTPI proposed in application No. 62/417,785. In particular, embodiments remove the need for an explicit indication of beam tracking process ID per CSI-RS resource, and there is no need to establish a beam tracking process framework. Rather, the object ID serves the purpose of beam tracking process indication in an implicit manner, thereby saving signaling overhead and avoiding the need to establish beam tracking processes.

In one specific embodiment, a framework defined for RS measurement configuration and reporting designed for link adaptation is re-used for beam indication. One example of an RS framework is the CSI framework already agreed in 3GPP, which has been described above. This CSI framework will be used in this discussion, but this embodiment is not limited to the current contents in the CSI framework. For instance, when additional reference signals, e.g., the SS block may be added to the framework, the embodiment is applicable also to those signals. An object in the CSI framework is defined and used in the following as either a "Resource setting" or "CSI-RS resource sets" or "CSI report setting".

Hence, in this embodiment, the resource setting could refer to any reference signal or synchronization channel such as DL DMRS, DL CSI-RS, DL TRS (reference signal for time and/or frequency offset estimation, thus channel tracking), DL PTRS or UL SRS or UL DMRS.

A feature of this embodiment is that the beam indication bits in the PDCCH refer to such an object. Hence, higher layers configure the UE with multiple such objects and the UE keeps track of the preferred receiver configuration (e.g. analog RX beam) for each of the object. The preferred receiver configuration for an object is updated every time the UE performs a measurement for each object. Hence, the receiver configuration associated with an object is not static, but may be updated based on performed measurements. In an alternative solution, the preferred receiver for an object is updated when UE performs a measurement for the object and when the UE is configured to do so, e.g. controlled by the DCI message that triggers the measurement. By associating an object with a data transmission or reception, the UE is then prepared to select a receiver configuration for receiving PDSCH or PDCCH based on the signaled object identifier.

Embodiments described herein also apply for uplink transmission in a similar manner as described for the downlink in the previous paragraph, so a PUSCH, PUCCH or SRS transmission is associated with an object and which object out of a set of objects is signaled to the UE by DCI or by higher layers such as RRC or MAC CE.

In one embodiment, the DCI field that indicates the quasi-co-location (QCL) assumptions the UE should assume when receiving or transmitting data is reused as the beam indication bits. These bits exist in LTE and are denoted "PQI bits". Hence PQI bits are re-used as beam indication bits. In LTE, the PQI indication in DCI points to one out of a set (of up to 4) of RRC configured "PQI Parameters", wherein the PQI parameters comprise "PDSCH-to-RE mapping" parameters (indicating how the PDSCH transmission is mapped to REs, i.e. defining RS patterns for e.g. CRS and ZP CSI-RS that the PDSCH is rate-matched around) as well as an indicator to a certain CSI-RS resource (indicated with a CSI-RS resource ID) that the UE should assume is QCL with the DMRS of the PDSCH transmission. Thus, in LTE, the PQI indicates QCL with a certain periodically transmitted CSI-RS resource, i.e. it may be seen as a switch between 4 statically configured QCL assumptions. In embodiments disclosed here, the QCL indication may instead point to a "Resource Setting" comprising multiple CSI-RS resources (where each CSI-RS resource may be associated with different QCL properties). Thus, to know which QCL assumption the UE shall assume (e.g. which RX beam is beneficial to apply), the "Resource Setting" may be coupled with a previously by the UE performed measurement report, for instance comprising a CRI, indicating a specific CSI-RS resource, selected by the UE, within the "Resource Setting". Thus, in contrast to the prior art (the PQI bits in LTE), the invention implements a switch between dynamically updated QCL assumptions.

When scheduling PDSCH, the DCI contains a field that points to the object and the UE can thus apply the receive (for PDCCH/PDSCH) or transmit (PUCCH/PUSCH) filtering, according to the indicated object. Alternatively, the PDCCH, PDSCH, PUCCH, and/or PUSCH can be connected to the objects, for example by higher layer configuration. DCI indication and higher layer connections can be used independently for different channels. For example, the PDCCH can be connected to one object by slower, higher layer configuration (such as RRC), while the PDSCH is dynamically, faster, configured by DCI to an object, which may be different than the object used for the PDCCH reception.

Different PDCCH candidates can be associated with different objects, to allow for robustness (i.e. different transmit beams can be used for different PDCCH candidates). The different PDCCH candidates is given by the PDCCH search space as in LTE or the different candidates can be in different slots. In one such embodiment, the UE is RRC configured to search for multiple PDCCH candidates in different PDCCH search spaces or in different Control Resource Sets (CORE-SETs), each PDDCH candidate is associated with a separate Resource Setting, corresponding to a separately maintained BPL. In some such embodiments, the UE is configured to search for a certain PDCCH candidate only in certain slots.

In one embodiment, the RX and/or TX configuration to use and store in the UE for a given object refers to the latest measurement made on one of the CSI-RS resources in that object. Alternatively, the gNB can indicate to the UE whether or not to update the RX and/or TX configuration for a given object when it performs the measurement and report, in the DCI message that schedules the report.

In another embodiment, the RX and/or TX configuration to use and store in the UE, for a given object refers to the latest CSI report transmitted from the UE to the network where the measurements were based on that object. If the report contains multiple CSI-RS Resource Indicators (CRI), the TX and/or RX configuration refers to a specific resource, in one example the most preferred resource (e.g. with highest SINR, CQI or RSRP) among the multiple reported resources of that object. In case a resource has been configured but no reporting has been made, the UE may still assume that the indicated object can be the reference for adjusting receiver or transmit spatial filters. More specifically, even if the UE has not made any report, the UE can autonomously store the UE RX receiver configuration for the most preferred CSI-RS resources in that object and use this configuration when the DCI indicates the object. The behavior may be summarized as a rule along the following lines (for the example that the object is the "Resource setting/set")—if the scheduling DCI contains an Resource setting/set indicator, then the UE may assume that the PDSCH DMRS is spatially QCL with the most preferred CSI-RS resource in the indicated Resource setting/set as reported in the latest CSI report for the corresponding RS setting/set.

The rule may be pre-agreed, e.g. by a standardized network specification.

Alternatively, for the example that the object is the "CSI reporting setting," the rule may be expressed as follows—if the scheduling DCI contains a CSI reporting setting indicator, then the UE may assume that the PDSCH DMRS is spatially QCL with the most preferred CSI-RS resource in the Resource setting linked to the indicated CSI reporting setting as reported in the latest CSI report.

In another embodiment, the UE reports multiple CSI-RS resource indicators (CRIs) each associated with one of the resources in the indicated RS setting/set. Further, the UE stores the TX and/or RX configuration associated with each of the multiple resources. When receiving a beam indication in the scheduling DCI in the form of a reference to the Resource setting/set, the UE will apply all the TX and/or RX configurations associated with the Resource setting/set. In this case, the specification rule may be expressed as—if the scheduling DCI contains a Resource setting/set indicator, then the UE may assume that one or more DMRS ports associated with one or more PDSCHs are spatially QCL with multiple selected CSI-RS resources in the indicated Resource setting/set as reported in the latest CSI report for the corresponding RS setting/set.

In the following embodiment, the UE may maintain several BPLs by performing measurements and reporting CSI on several resource settings. The UE is scheduled in DCI with a high-rank PDSCH transmission where the corresponding DMRS ports belong to different DMRS port groups. Each DMRS port group may be associated with separate QCL assumptions and may be transmitted on different beams. Thus, a separate beam indication is given for each DMRS port group, indicating a separate Resource Setting, corresponding to a separate BPL.

In yet other embodiments, the UE reports multiple CRIs in a CSI report, indicating a number of CSI-RS resources within a Resource Setting. Along with each CRI, a "beam group indicator" (BGI) is reported as well. The BGI may indicate which CSI-RS resources could be received simultaneously at the UE in a hypothetical high-rank transmission in the sense that resources corresponding to CRIs with different reported BGIs may be received simultaneously.

In one such embodiment, the UE receives a single PDCCH scheduling a high-rank PDSCH transmission and where multiple DMRS port groups are used. The beam indication is provided in two parts. First, a Resource Setting is indicated, indicating QCL assumptions for the entire PDSCH transmission. Second, for each DMRS port group, a BGI is indicated. Based on this indication, the UE associates each DMRS port group with the latest reported CRI with the indicated BGI. Alternatively, the beam indication is provided in a single step. For each DMRS port group, a Resource Setting and a BGI is indicated.

In another such embodiment, the UE receives multiple PDCCH simultaneously, where each PDCCH schedules a separate PDSCH and where the PDSCHs are received simultaneously at the UE, resulting in a high rank transmission. In this case, both a Resource Setting and a BGI may be indicated in each PDCCH, resulting in a beam indication applicable to all layers of the scheduled PDSCH.

Figure 4:
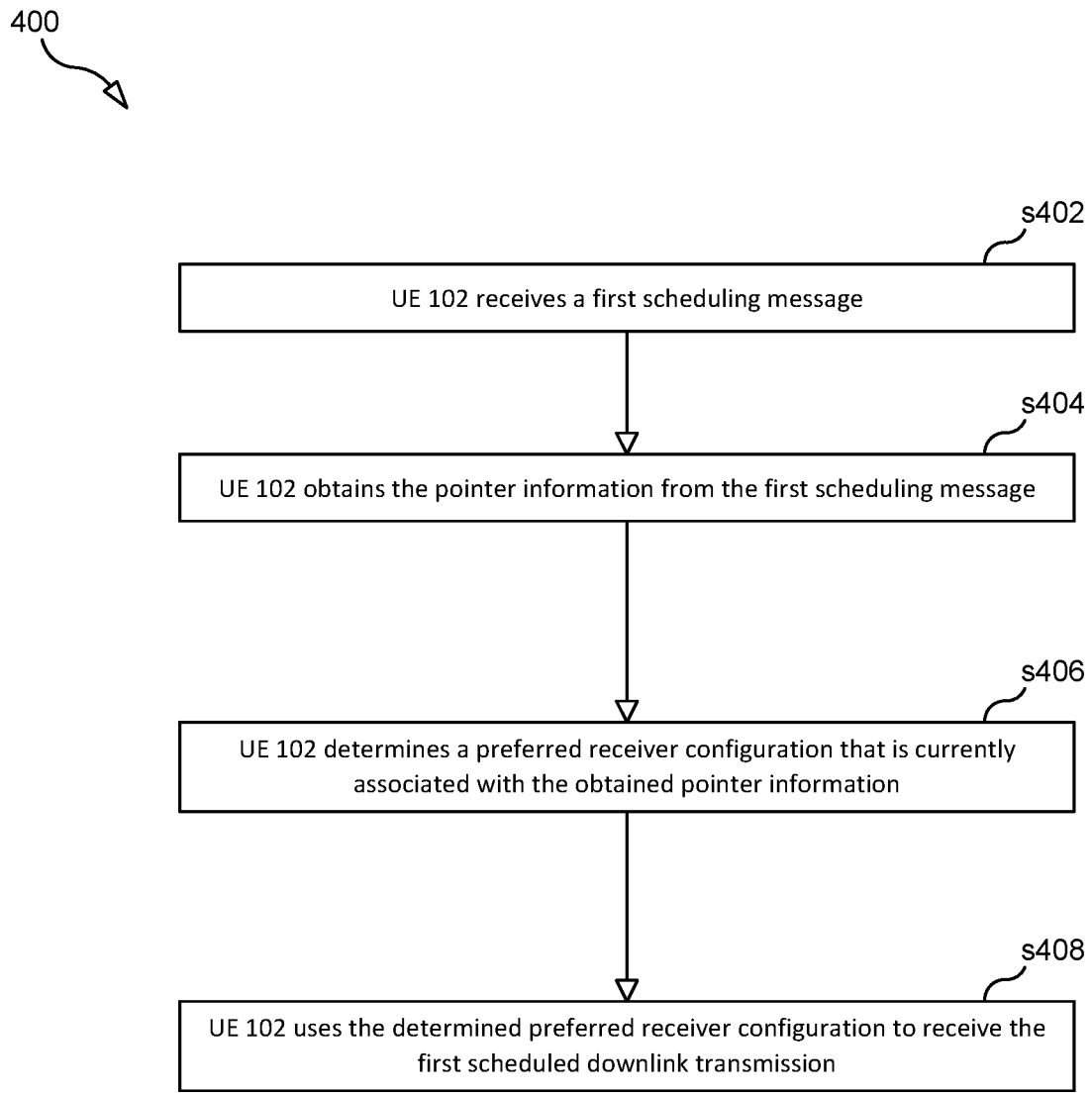
FIG. 4 is a flow chart illustrating a process according to some embodiments.

Referring now to FIG. 4, FIG. 4 is a flow chart illustrating a process 400 performed by UE 102. Process 400 may begin in step s402, in which UE 102 receives a first scheduling message regarding a first scheduled downlink transmission for UE 102, wherein the first scheduling message comprises pointer information pointing to an object (e.g., an object identifier) configured in UE 102. In some embodiments, the configured object is a Radio Resource Control (RRC) configured object. In some embodiments, the RRC configured object is a reference signal (RS) measurement object (e.g., a Resource Setting, a CSI-RS resource set, and a CSI report setting). In such embodiments, the object may contain multiple reference signals (RS) (e.g. multiple CSI-RS resources or CSI-RS in multiple OFDM symbols in the same slot (beam sweep)). In some embodiments, UE 102 is configured to report to a serving node a preferred reference signal among the multiple references signals in the object.

As a result of receiving the first scheduling message in step s402: UE 102 obtains the pointer information from the first scheduling message (step s404); UE 102 determines a preferred receiver configuration that is currently associated with the obtained pointer information (step s406) (e.g., UE 102 determines a preferred analog RX beam that is associated with the object to which the pointer information points); and UE 102 uses the determined preferred receiver configuration to receive the first scheduled downlink transmission (step s408).

In some embodiments, the first scheduling message is Downlink Control Information (DCI). In such an embodiment, the pointer information may consist of a set of bits of the DCI, which set of bits indicate at least a spatial quasi-co-location (QCL) assumption UE 102 should assume when receiving the first scheduled downlink transmission.

Figure 5:
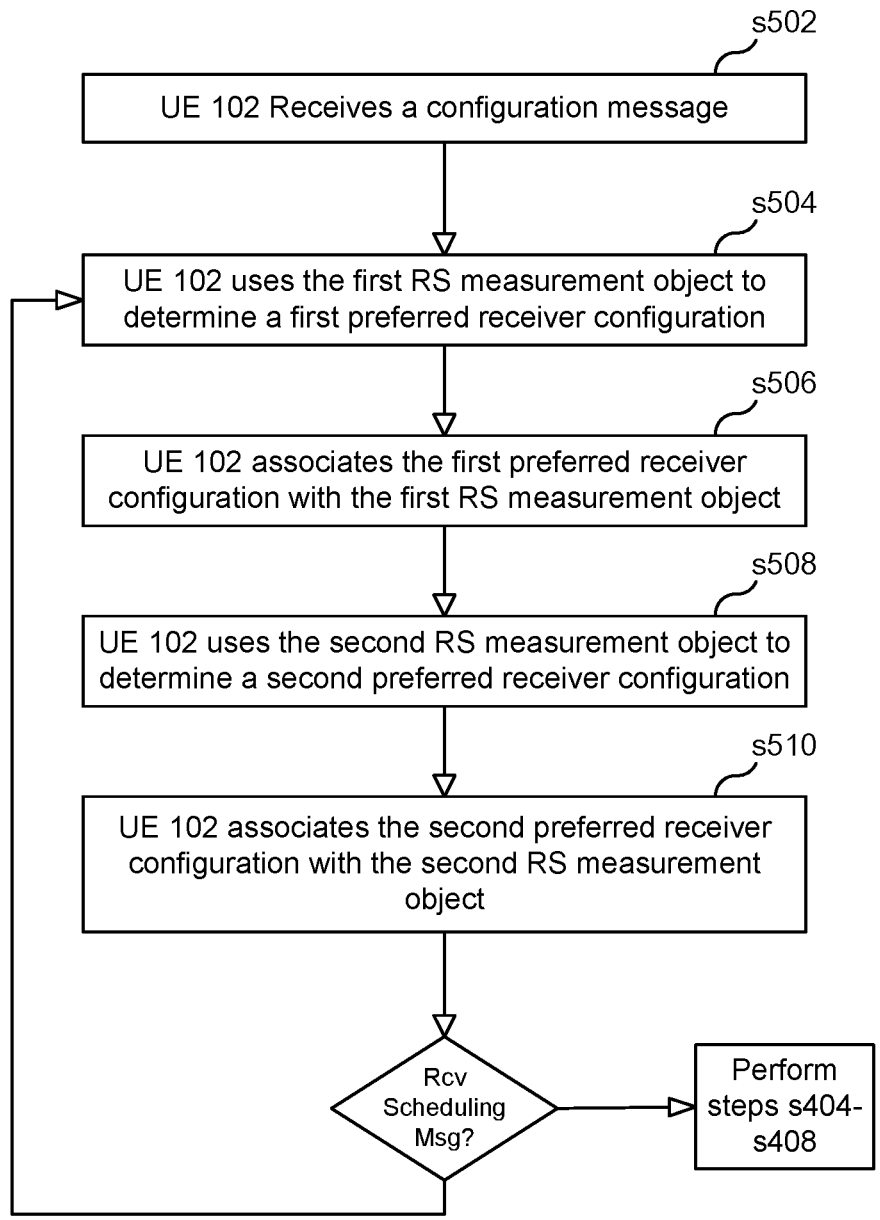
FIG. 5 is a flow chart illustrating a process according to some embodiments.

FIG. 5 is a flow chart that illustrates additional steps that may be performed by UE 102. As shown in FIG. 5, prior to UE 102 receiving the first scheduling message, UE 102 receives a configuration message for configuring a first reference signal (RS) measurement object and a second RS measurement object (step s502).

In step s504, after receiving the configuration message and prior to receiving the first scheduling message, UE 102 uses the first RS measurement object to determine a first preferred receiver configuration (e.g., a first preferred RX beam). In step s506, UE 102 associates the first preferred receiver configuration with the first RS measurement object (e.g., the UE associates the first preferred receiver configuration with the pointer information that points to the first RS measurement object). For example, in step s506 UE 102 stores in a database a first record comprising a first field that contains the first preferred receiver configuration or a pointer thereto and a second field that contains the pointer information pointing to the first RS measurement object.

In step s508, after receiving the configuration message and prior to receiving the first scheduling message, UE 102 uses the second RS measurement object to determine a second preferred receiver configuration. In step s510, UE 102 associates the second preferred receiver configuration with the second RS measurement object (e.g., the UE associates the second preferred receiver configuration with the pointer information that points to the second RS measurement object). For example, in step s510 UE 102 stores in the database a second record comprising a first field that contains the second preferred receiver configuration or a pointer thereto and a second field that contains the pointer information pointing to the second RS measurement object.

As described herein, UE 102 is configured such that: if the pointer information included in the first scheduling message points to the first RS measurement object, then UE 102 uses the preferred receiver configuration that is associated with the first RS measurement object to receive the scheduled downlink transmission, and if the pointer information included in the first scheduling message points to the second RS measurement object, then UE 102 uses the preferred receiver configuration associated with the first RS measurement object to receive the scheduled downlink transmission. Accordingly, after obtaining the pointer information included in the scheduling message, UE 102 may use that pointer information to retrieve from the database the record that contains the pointer information that matches the pointer information obtained from the scheduling message and then use the receiver configuration indicated in the retrieved database record to receive the scheduled transmission.

As shown in FIG. 5, UE 102 may continually determine a new preferred receiver configuration for each configured RS measurement object and associate the new preferred receiver configuration with the corresponding object.

For example, after using the first RS measurement object to determine the first preferred receiver configuration, UE 102 uses the first RS measurement object to determine a third preferred receiver configuration, and after determining the third preferred receiver configuration, UE 102 associates the third preferred receiver configuration with the first RS measurement object and disassociates the first preferred receiver configuration with the first RS measurement object. For example, UE 102 may modify database record in which the first preferred receiver configuration is associated with the first RS measurement object by replacing the receiver configuration information stored in the first field of the record with receiver configuration information that points to the third preferred receiver configuration.

As further shown in FIG. 5, UE 102 may receive additional scheduling messages such as a second scheduling message regarding a second scheduled downlink transmission for UE 102, wherein the second scheduling message comprises pointer information pointing to the an RS measurement object. Assuming the pointer information points to the first RS measurement object, then, in response to receiving the second scheduling message, UE 102 determines the preferred receiver configuration is currently associated with the first RS measurement object, thereby determining that the third preferred receiver configuration is the currently preferred receiver configuration for the first RS measurement object. Consequently, UE 102 uses the third preferred receiver configuration to receive the second scheduled downlink transmission.

Figure 6:
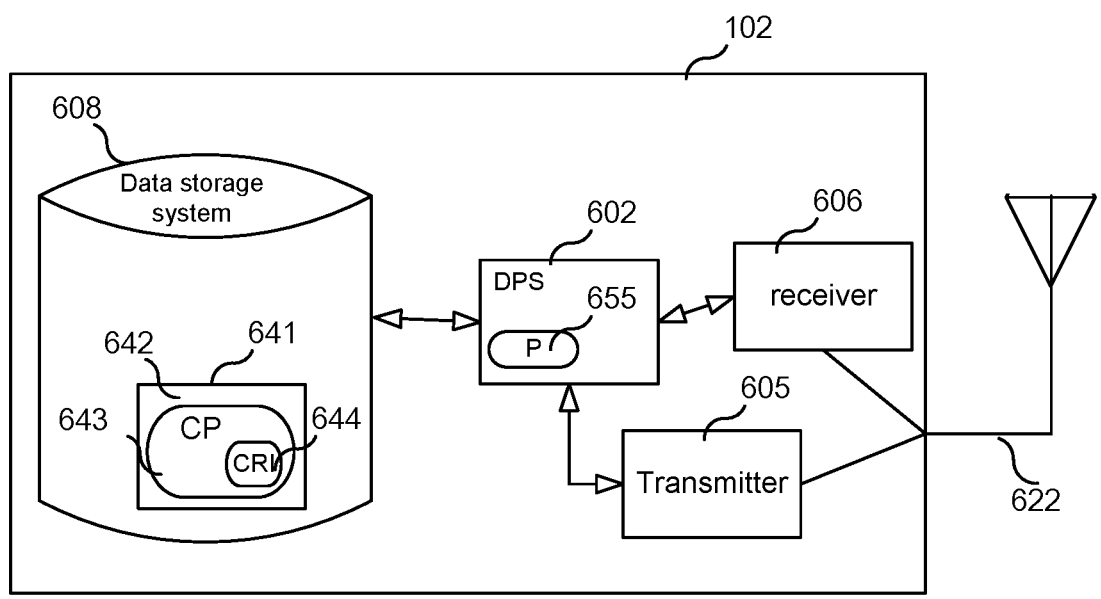
FIG. 6 is a block diagram of a UE according to some embodiments.

FIG. 6 is a block diagram of UE 102 according to some embodiments. As shown in FIG. 6, the UE may comprise: a data processing system (DPS) 602, which may include one or more processors 655 (e.g., a general purpose microprocessor and/or one or more other processors, such as an application specific integrated circuit (ASIC), field-programmable gate arrays (FPGAs), and the like); a radio transmitter 605 and a radio receiver 606 coupled to an antenna 622 for use in wirelessly communicating with a radio access network (RAN) node (e.g., TRP 104); and local storage unit (a.k.a., "data storage system") 608, which may include one or more non-volatile storage devices and/or one or more volatile storage devices (e.g., random access memory (RAM)). In embodiments where the UE includes a general purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media (e.g., a DVD), memory devices (e.g., random access memory), and the like. In some embodiments, the CRI 644 of computer program 643 is configured such that when executed by data processing system 602, the CRI causes the UE to perform steps described above (e.g., steps described above with reference to the flow charts). In other embodiments, the UE may be configured to perform steps described herein without the need for code. That is, for example, data processing system 602 may consist merely of one or more ASICs. Hence, the features of the embodiments described herein may be implemented in hardware and/or software.

Figure 7:
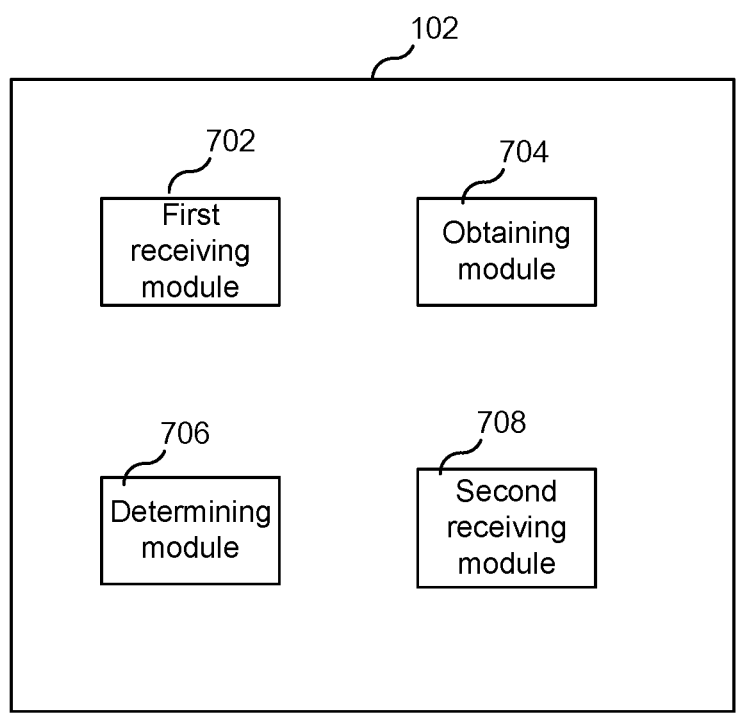
FIG. 7 is a diagram showing functional modules of a UE according to some embodiments.

FIG. 7 is a diagram showing functional modules of UE 102 according to some embodiments. As shown in FIG. 7, UE 102 includes: a first receiving module 702 for receiving a first scheduling message regarding a first scheduled downlink transmission for the UE, wherein the first scheduling message comprises pointer information pointing to an object configured in the UE; an obtaining module 704 configured to obtain the pointer information from the first scheduling message; a determining module 706 configured to determine a preferred receiver configuration that is currently associated with the obtained pointer information; and a second receiving module 708 configured to use the determined preferred receiver configuration to receive the first scheduled downlink transmission.

Figure 8:
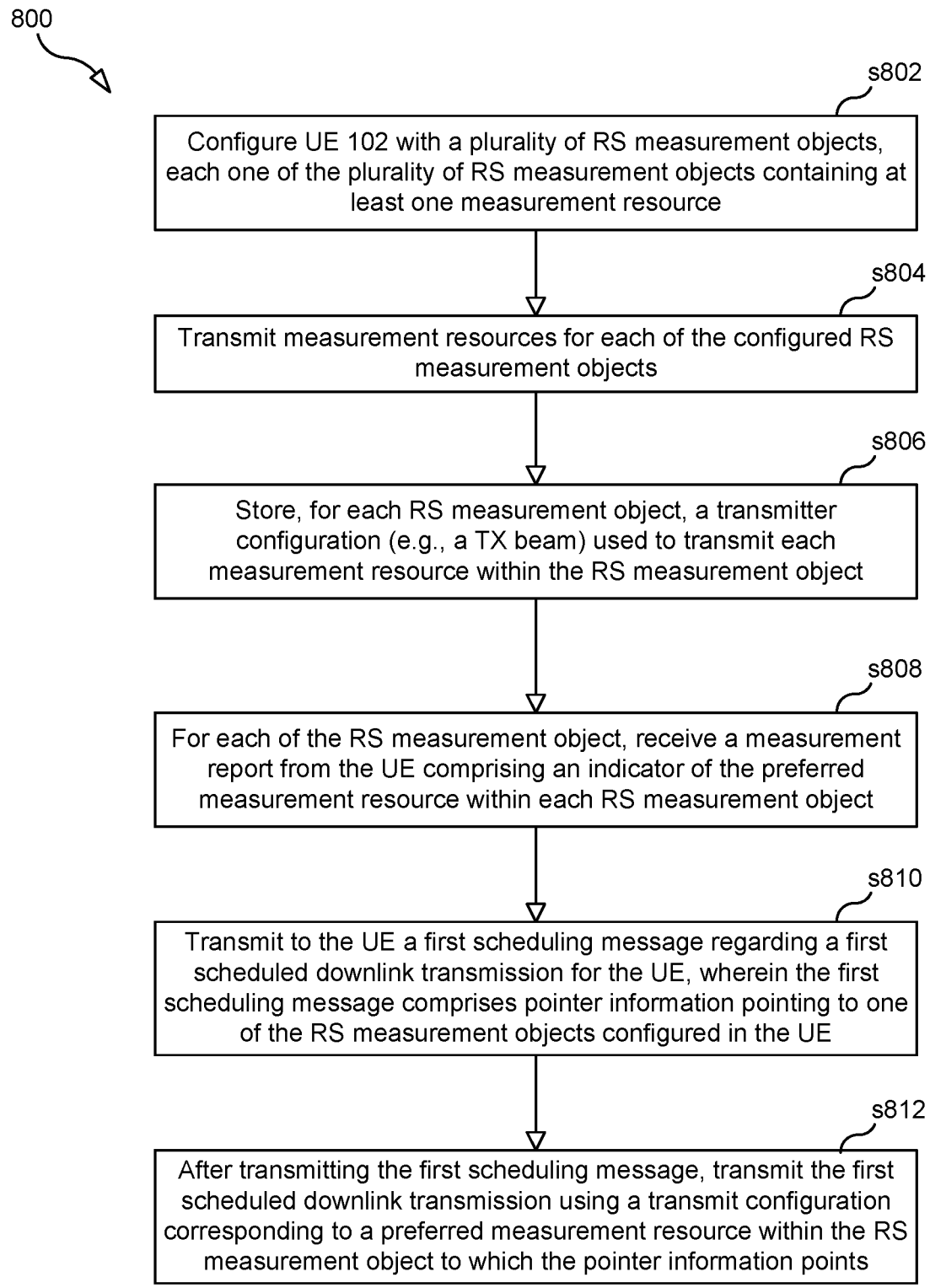
FIG. 8 is a flow chart illustrating a process according to some embodiments.

FIG. 8 is a flow chart illustrating a process 800 according to some embodiments. Process 800 may begin in step 802, in which a network 3210 (e.g., a TRP 104 a combination of a TRP and one or more other network nodes) configures UE 102 with a plurality of RS measurement objects, each one of the plurality of RS measurement objects containing at least one measurement resource (e.g., CSI-RS resources).

In step 804, the NW transmits measurement resources for each of the configured RS measurement objects.

In step 806, the NW stores, for each RS measurement object, a transmitter configuration (e.g., a TX beam) used to transmit each measurement resource within the RS measurement object.

In step 808, for each of the RS measurement object, the NW receives a measurement report from the UE comprising an indicator of the preferred measurement resource within each RS measurement object (e.g., UE points out the preferred beam within each RS measurement object in case the RS measurement object contains multiple measurement resources).

In step 810, the NW transmits to the UE a first scheduling message regarding a first scheduled downlink transmission for the UE, wherein the first scheduling message comprises pointer information pointing to one of the RS measurement objects configured in the UE (e.g., the NW points out the RS measurement object to use for receiving data).

In step 812, after transmitting the first scheduling message, the NW transmits the first scheduled downlink transmission using a transmit configuration corresponding to a preferred measurement resource within the RS measurement object to which the pointer information points (e.g., the NW use the TX beam corresponding to the preferred beam within the RS measurement object as reported by the UE).

Figure 9:
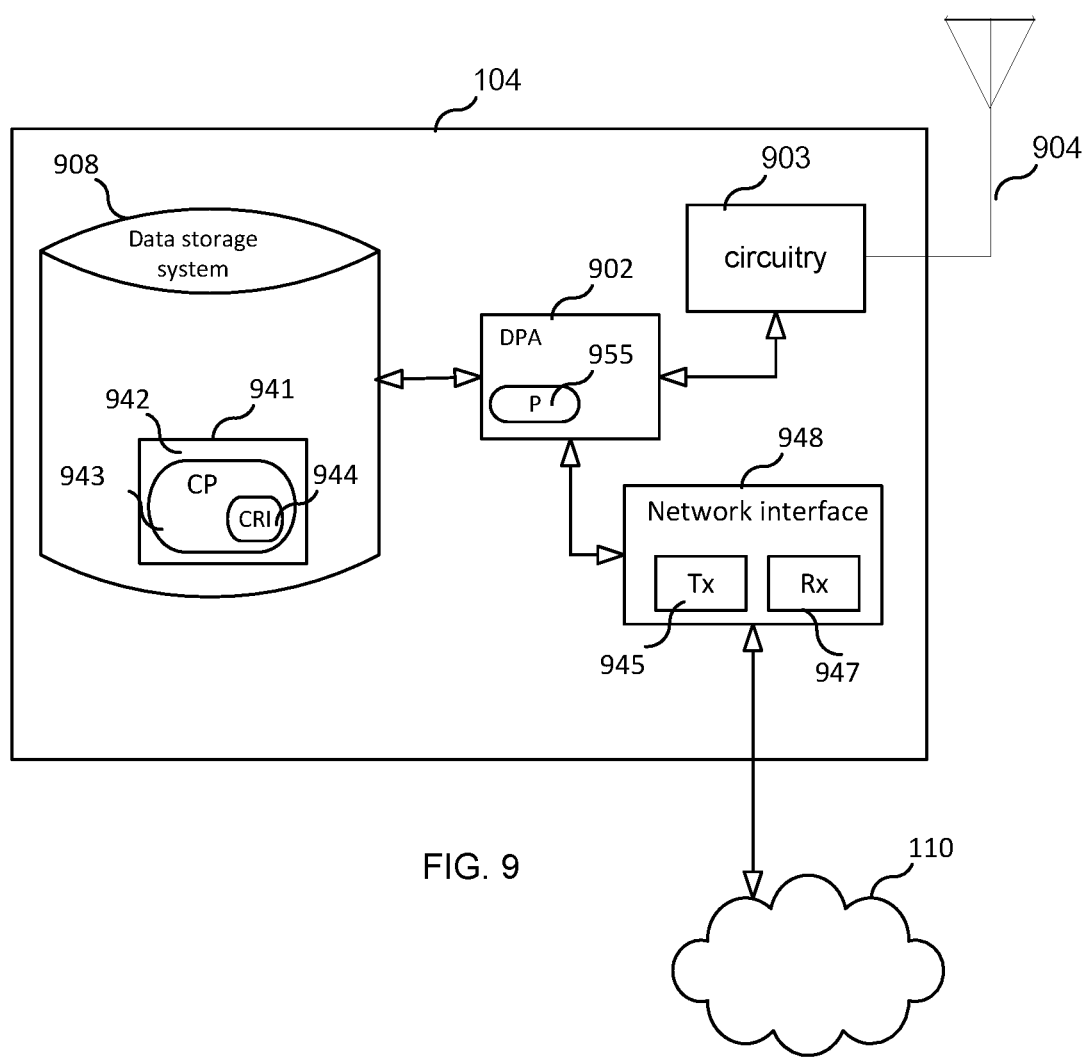
FIG. 9 is a block diagram of a TRP according to some embodiments.

FIG. 9 is a block diagram of TRP 104 according to some embodiments. As shown in FIG. 9, TRP 104 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling the network node to transmit data to and receive data from other nodes connected to network 110 (e.g., an Internet Protocol (IP) network) to which network interface 948 is connected; circuitry 903 (e.g., radio transceiver circuitry) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where DPA 902 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory), and the like. In some embodiments, the CRI 944 of computer program 943 is configured such that when executed by data processing apparatus 902, the CRI causes TRP 104 to perform steps described herein (e.g., steps described herein with reference to the flow charts and/or message flow diagrams). In other embodiments, TRP 104 may be configured to perform steps described herein without the need for code. That is, for example, DPA 902 may consist merely of one or more ASICs. Hence, the features of the embodiments described herein may be implemented in hardware and/or software.

Figure 10:
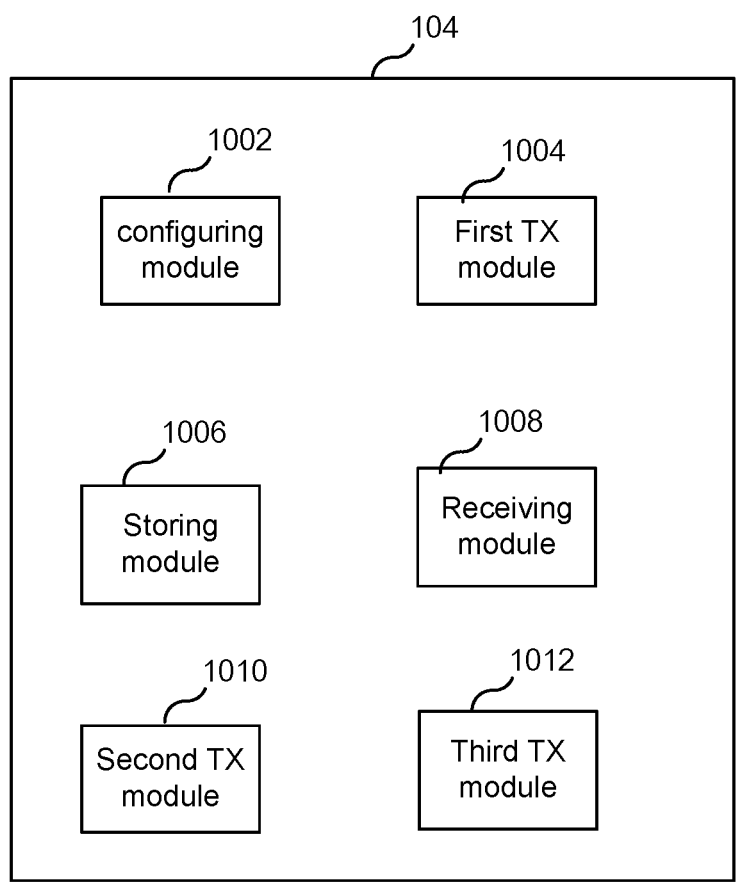
FIG. 10 is a diagram showing functional modules of a TRP according to some embodiments.

FIG. 10 is a diagram showing functional modules of TRP 104 according to some embodiments. As shown in FIG. 10, TRP 104 includes: a configuration module 1002 for configuring a UE with a plurality of RS measurement objects, each one of the plurality of RS measurement objects containing at least one measurement resource (e.g., CSI-RS resources). TRP 104 also includes a first transmitting (TX) module 1004 for transmitting measurement resources for each of the configured RS measurement objects. TRP 104 further includes a storing module 1006 for storing, for each RS measurement object, a transmitter configuration (e.g., a TX beam) used to transmit each measurement resource within the RS measurement object. TRP 104 also includes a receiving module 1008 for receiving, for each of the RS measurement object, a measurement report from the UE comprising an indicator of the preferred measurement resource within each RS measurement object (e.g., UE points out the preferred beam within each RS measurement object in case the RS measurement object contains multiple measurement resources). TRP 104 also includes a second transmitting module 1010 for transmitting to the UE a first scheduling message regarding a first scheduled downlink transmission for the UE, wherein the first scheduling message comprises pointer information pointing to one of the RS measurement objects configured in the UE (e.g., the NW points out the RS measurement object to use for receiving data); and a third transmitting module 1012 for, after the first scheduling message is transmitted, transmitting the first scheduled downlink transmission using a transmit configuration corresponding to a preferred measurement resource within the RS measurement object to which the pointer information points (e.g., the NW use the TX beam corresponding to the preferred beam within the RS measurement object as reported by the UE).

Figure 11:
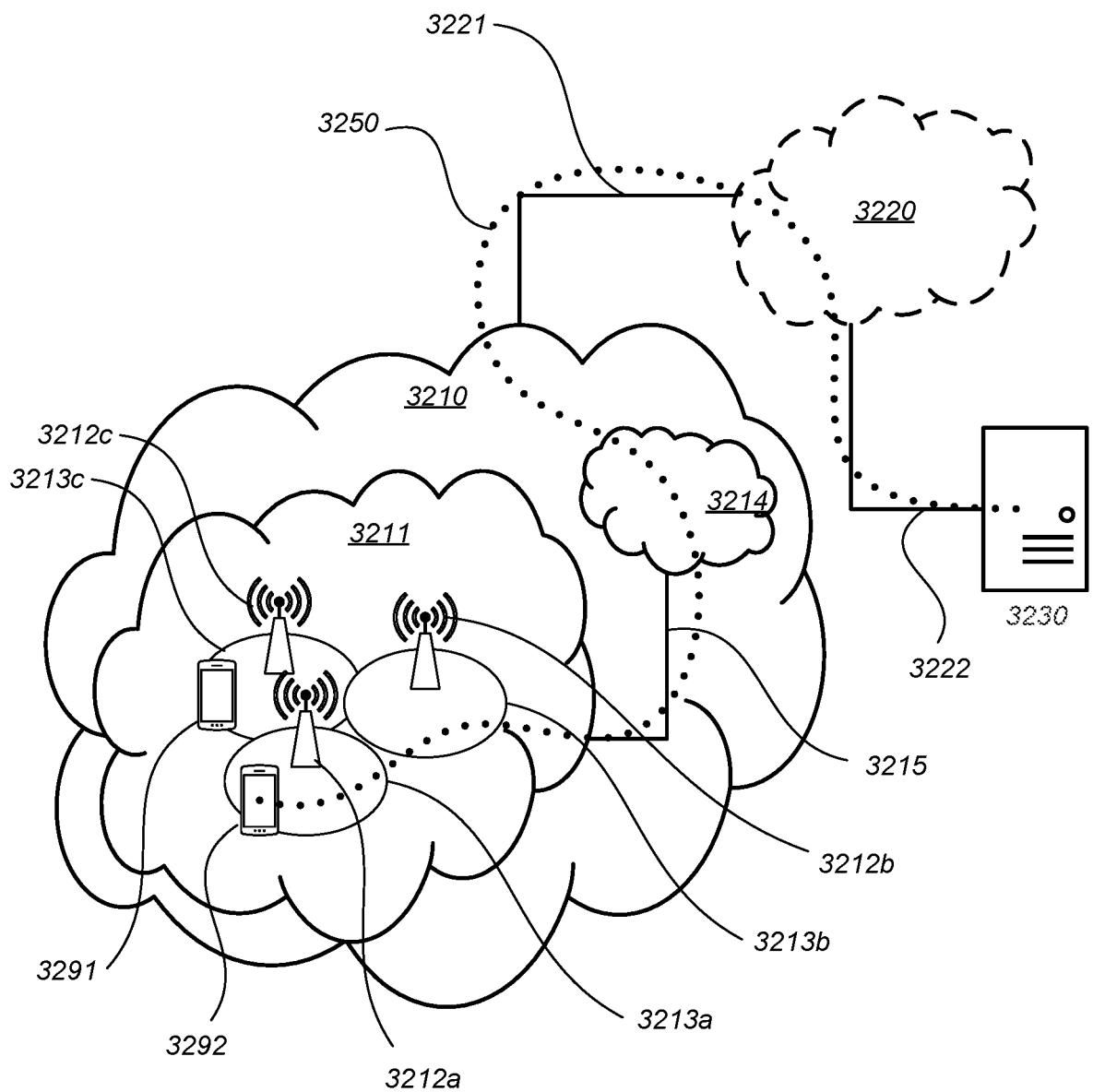
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of TRPs 3212a, 3212b, 3212c, such as NBs, eNBs, gNBs or other types of wireless access points, each defining a corresponding coverage area 3213a, 3213b, 3213c. Each TRP 3212a, 3212b, 3212c is connectable to the core network 3214 over a wired or wireless connection 3215. A first user equipment (UE) 3291 located in coverage area 3213c is configured to wirelessly connect to, or be paged by, the corresponding TRP 3212c. A second UE 3292 in coverage area 3213a is wirelessly connectable to the corresponding TRP 3212a. While a plurality of UEs 3291, 3292 are illustrated in this example, the disclosed embodiments are equally applicable to a situation where a sole UE is in the coverage area or where a sole UE is connecting to the corresponding TRP 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a TRP 3212 may not or need not be informed about the past routing of an incoming downlink communication with data originating from a host computer 3230 to be forwarded (e.g., handed over) to a connected UE 3291. Similarly, the TRP 3212 need not be aware of the future routing of an outgoing uplink communication originating from the UE 3291 towards the host computer 3230.

Example implementations, in accordance with an embodiment, of the UE, TRP and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a TRP 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the TRP 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the TRP 3320 further includes processing circuitry 3328, which may comprise one or more programmable processors, application-specific integrated circuits, field programmable gate arrays or combinations of these (not shown) adapted to execute instructions. The TRP 3320 further has software 3321 stored internally or accessible via an external connection.

The communication system 3300 further includes the UE 3330 already referred to. Hardware 3335 may include a radio interface 3337 configured to set up and maintain a wireless connection 3370 with a TRP serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
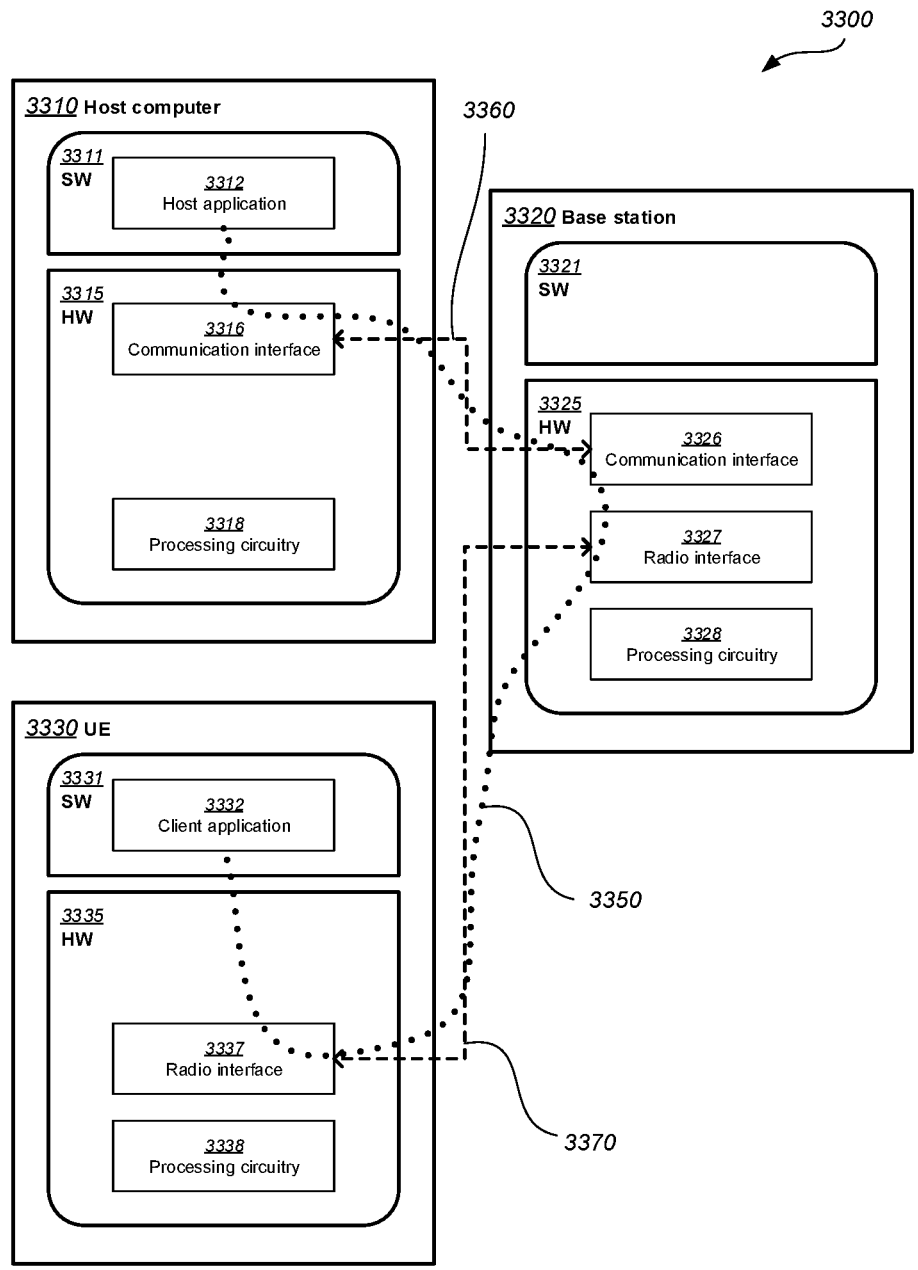
FIG. 12 is a generalized block diagram of a host computer communicating via a base station with a user equipment over a partially wireless connection.

It is noted that the host computer 3310, TRP 3320 and UE 3330 illustrated in FIG. 12 may be identical to the host computer 3230, one of the TRPs 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the TRP 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the TRP 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, as seen above, the teachings of these embodiments may improve the need for an explicit indication of beam tracking process ID per CSI-RS resource, and there is no need to establish a beam tracking process framework and thereby provide benefits such as reduced user waiting time and/or better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the TRP 3320, and it may be unknown or imperceptible to the TRP 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
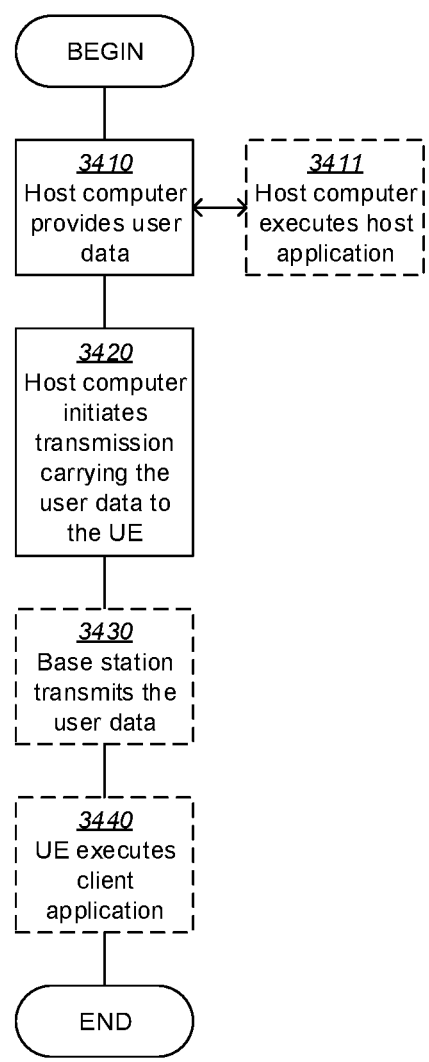
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a TRP and a UE, which may be those described with reference to FIGS. 11 and 12. For simplicity of explanation, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the TRP transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 14:
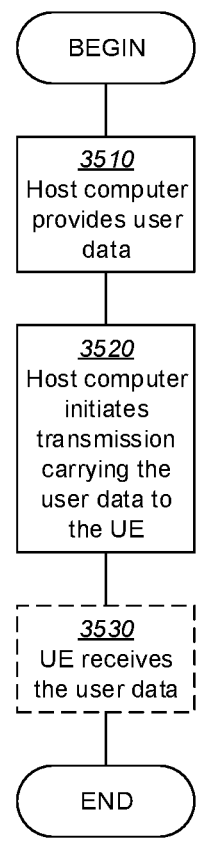
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a TRP and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the TRP, in accordance with the teachings of the embodiments described throughout this disclosure. In an optional third step 3530, the UE receives the user data carried in the transmission.

While various embodiments are described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A host computer configured to operate in a communication system to provide an over-the-top (OTT) service, the host computer comprising:
processing circuitry configured to provide user data associated with the OTT service; and
a network interface configured to initiate transmission of the user data to a network node in a cellular network for transmission to a user equipment (UE), the network node having a communication interface and processing circuitry, the processing circuitry of the network node configured to:
configure the UE with a plurality of Reference Signal (RS) measurement objects, each one of the plurality of RS measurement objects containing at least one measurement resource;
transmit measurement resources for each of the RS measurement objects;
store, for each RS measurement object, a transmitter configuration used to transmit each measurement resource within the RS measurement object;
for each of the RS measurement object, receive a measurement report from the UE comprising an indicator of a preferred measurement resource within each RS measurement object;
transmit to the UE a first scheduling message regarding a first scheduled downlink transmission for the UE, wherein the first scheduling message comprises pointer information pointing to one of the RS measurement objects configured in the UE, wherein the pointer information is currently associated with a preferred receiver configuration in the UE, and the preferred receiver configuration is an analog receive (RX) beam, and wherein the first scheduling message is Downlink Control Information (DCI); and
after transmitting the first scheduling message, transmit the first scheduled downlink transmission using a transmit configuration corresponding to the preferred measurement resource within the RS measurement object to which the pointer information points, wherein the first scheduled downlink transmission comprises the user data.

2. The host computer of claim 1, wherein:
the processing circuitry of the host is configured to execute a host application that provides the user data; and
the host application is configured to communicate with a client application associated with the host application to receive the transmission of user data from the host.

3. The host computer of claim 1, wherein the pointer information comprises a set of bits of the DCI, which set of bits indicate at least a spatial quasi-co-location (QCL) assumption the UE should assume when receiving the first scheduled downlink transmission.

4. The host computer of claim 1, wherein the measurement object is one of a resource setting, a Channel State Information Reference Signal (CSI-RS) resource set, and a CSI report setting.

5. A method implemented in a host computer associated with an over-the-top (OTT) service configured to operate in a communication system that further includes a network node and a user equipment (UE), the method comprising:
providing user data for the UE, the user data being associated with the OTT service; and
initiating a transmission carrying the user data to the UE via a cellular network comprising the network node, wherein the network node is configured to perform operations comprising:
configuring the UE with a plurality of Reference Signal (RS) measurement objects, each one of the plurality of RS measurement objects containing at least one measurement resource;
transmitting measurement resources for each of the RS measurement objects;
storing, for each RS measurement object, a transmitter configuration used to transmit each measurement resource within the RS measurement object;
for each of the RS measurement object, receiving a measurement report from the UE comprising an indicator of a preferred measurement resource within each RS measurement object;
transmitting to the UE a first scheduling message regarding a first scheduled downlink transmission for the UE, wherein the first scheduling message comprises pointer information pointing to one of the RS measurement objects configured in the UE, wherein the pointer information is currently associated with a preferred receiver configuration in the UE, and the preferred receiver configuration is an analog receive (RX) beam, and wherein the first scheduling message is Downlink Control Information (DCI); and after transmitting the first scheduling message, transmitting the first scheduled downlink transmission using a transmit configuration corresponding to the preferred measurement resource within the RS measurement object to which the pointer information points, wherein the first scheduled downlink transmission comprises the user data associated with the OTT service.

6. The method of claim 5, further comprising, at the network node, transmitting the user data provided by the host for the UE.

7. The method claim 5, further comprising executing a host application that interacts with a client application executing on the UE to provide user data to the UE, the client application being associated with the host application.

8. A communication system configured to provide an over-the-top service, the communication system comprising:
a host comprising:
processing circuitry configured to provide user data for a user equipment (UE), the user data being associated with the over-the-top service; and
a network interface configured to initiate transmission of the user data toward a cellular network node for transmission to the UE, the network node having a communication interface and processing circuitry, the processing circuitry of the network node configured to:
configure the UE with a plurality of Reference Signal (RS) measurement objects, each one of the plurality of RS measurement objects containing at least one measurement resource;
transmit measurement resources for each of the RS measurement objects;
store, for each RS measurement object, a transmitter configuration used to transmit each measurement resource within the RS measurement object;
for each of the RS measurement object, receive a measurement report from the UE comprising an indicator of a preferred measurement resource within each RS measurement object;
transmit to the UE a first scheduling message regarding a first scheduled downlink transmission for the UE, wherein the first scheduling message comprises pointer information pointing to one of the RS measurement objects configured in the UE, wherein the pointer information is currently associated with a preferred receiver configuration in the UE, and the preferred receiver configuration is an analog receive (RX) beam, and wherein the first scheduling message is Downlink Control Information (DCI); and
after transmitting the first scheduling message, transmit the first scheduled downlink transmission using a transmit configuration corresponding to the preferred measurement resource within the RS measurement object to which the pointer information points, wherein the first scheduled downlink transmission comprises the user data.

9. The communication system of claim 8, further comprising:
the network node; and/or
the user equipment.

10. The communication system of claim 9, wherein:
the processing circuitry of the host is configured to execute a host application that provides the user data; and
the host application is configured to communicate with a client application associated with the host application to receive the transmission of user data from the host.

11. The communication system of claim 10, wherein the host application and the client application are associated with a provider of the OTT service.

* * * * *